United States Patent
Tamir et al.

(10) Patent No.: US 11,373,354 B2
(45) Date of Patent: Jun. 28, 2022

(54) TECHNIQUES FOR RENDERING THREE-DIMENSIONAL ANIMATED GRAPHICS FROM VIDEO

(71) Applicant: Track160, Ltd., Petach Tiqva (IL)

(72) Inventors: Michael Tamir, Tel Aviv (IL); Michael Birnboim, Holon (IL); Yaacov Chernoi, Petach-Tikva (IL); Antonio Dello Iacono, Tel Aviv (IL); Tamir Anavi, Kfar Saba (IL); Michael Priven, Ramat Gan (IL); Alexander Yudashkin, Tel Aviv (IL)

(73) Assignee: Track160, Ltd., Petach Tiqva (IL)

( * ) Notice: Subject to any disclaimer, the term of this patent is extended or adjusted under 35 U.S.C. 154(b) by 233 days.

(21) Appl. No.: 16/800,421

(22) Filed: Feb. 25, 2020

(65) Prior Publication Data

US 2020/0193671 A1 Jun. 18, 2020

Related U.S. Application Data

(63) Continuation of application No. PCT/US2018/049503, filed on Sep. 5, 2018.
(Continued)

(51) Int. Cl.
*G06T 13/40* (2011.01)
*G06T 7/246* (2017.01)

(52) U.S. Cl.
CPC .............. *G06T 13/40* (2013.01); *G06T 7/251* (2017.01); *G06T 2207/10016* (2013.01); *G06T 2207/20081* (2013.01); *G06T 2207/30221* (2013.01)

(58) Field of Classification Search
CPC ............. G06T 13/40; G06T 7/251; G06T 2207/10016; G06T 2207/20081; G06T 2207/30221
See application file for complete search history.

(56) References Cited

U.S. PATENT DOCUMENTS

| 2007/0253618 A1* | 11/2007 | Kim | G06T 7/80 |
| | | | 382/154 |
| 2008/0192116 A1* | 8/2008 | Tamir | G06T 7/292 |
| | | | 348/157 |

(Continued)

FOREIGN PATENT DOCUMENTS

EP 2150057 A2 2/2010

OTHER PUBLICATIONS

Kalra, et al., "Real-time Animation of Realistic Virtual Humans", MIRALab, CUI, University of Geneva, Switzerland, 1998, pp. 1-23.
(Continued)

*Primary Examiner* — Jitesh Patel
(74) *Attorney, Agent, or Firm* — M&B IP Analysts, LLC (57) ABSTRACT

A system and method for creating 3D graphics representations from video. The method includes: generating a skeletal model for each of at least one non-rigid object shown in a video feed, wherein the video feed illustrates a sports event in which at least one of the non-rigid objects is moving; determining at least one 3D rigged model for the at least one skeletal model; and rendering the at least one skeletal model as a 3D representation of the sports event, wherein rendering the 3D skeletal model further comprises wrapping each of at least one 3D skeletal model with one of the at least one 3D rigged model, each 3D skeletal model corresponding to one of the at least one skeletal model, wherein each 3D rigged model is moved according to the movement of the respective skeletal model when the 3D skeletal model is wrapped with the 3D rigged model.

47 Claims, 7 Drawing Sheets

Related U.S. Application Data (60) Provisional application No. 62/556,758, filed on Sep. 11, 2017.

(56) References Cited

U.S. PATENT DOCUMENTS

| | | | | |
|---|---|---|---|---|
| 2008/0312010 | A1* | 12/2008 | Marty | G06T 7/285 |
| | | | | 73/865.4 |
| 2009/0046152 | A1 | 2/2009 | Aman | |
| 2010/0026809 | A1 | 2/2010 | Curry | |
| 2010/0215257 | A1* | 8/2010 | Dariush | G06K 9/48 |
| | | | | 382/159 |
| 2011/0302293 | A1* | 12/2011 | Buban | H04L 67/06 |
| | | | | 709/224 |
| 2013/0250050 | A1 | 9/2013 | Kanaujia et al. | |
| 2014/0160122 | A1* | 6/2014 | Chou | G06T 17/00 |
| | | | | 345/420 |
| 2014/0219550 | A1* | 8/2014 | Popa | G06K 9/00342 |
| | | | | 382/154 |
| 2017/0000388 | A1* | 1/2017 | Jessen | A61B 5/112 |
| 2017/0128840 | A1* | 5/2017 | Croci | A63F 13/65 |
| 2017/0238055 | A1* | 8/2017 | Chang | H04N 21/4223 |
| | | | | 725/19 |
| 2018/0353836 | A1* | 12/2018 | Li | G06K 9/00711 |

OTHER PUBLICATIONS

The International Search Report and the Written Opinion of the International Searching Authority for PCT/US2018/049503, dated Jan. 24, 2019, ISA/Russia, Moscow, Russia.

Arachchi, et. al., "Motion Tracking by Sensors for Real-time Human Skeleton Animation" International Journal on Advances in ICT for Emerging Regions 2016 9 (2), Dec. 4, 2016.

Gall, et. al., "Motion Capture Using Joint Skeleton Tracking and Surface Estimation" 2009 IEEE Conference on Computer Vision and Pattern Recognition: CVPR 2009, Jun. 20-25, 2009, pp. 1746-1753.

Lu, et al., "Learning to Track and Identify Players from Broadcast Sports Videos" IEEE Transactions on Pattern Analysis and Machine Intelligence, vol. 35, No. 7, Jul. 2013.

Shingade, et al., "Animation of 3D Human Model Using Markerless Motion Capture Applied to Sports", International Journal of Computer Graphics & Animation (IJCGA), vol. 4, No. 1, Jan. 2014.

The Partial Supplementary European Search Report (R. 164 EPC) for European Application No. 18853733.6, dated May 5, 2021, European Patent Office, Munich, Germany.

Laraba et al., "3D Skeleton-Based Action Recognition by Representing Motion Capture Sequences as 2D-RGB Images", John Wiley & Sons, Ltd.: Comput Anim Virtual Worlds, Mar. 17, 2017.

Martinez et al., "A Simple Yet Effective Baseline for 3d Human Pose Estimation", University of British Columbia, May 8, 2017.

Park et al., "3D Human Pose Estimation Using Convolutional Neural Networks with 2D Pose Information", Advances in Intelligent Data Analysis XIX, Springer International Publishing, Cham, pp. 156-169, Nov. 24, 2016.

Pavlakos et al., "Course-to-Fine Volumetric Prediction for Single-Image 3D Human Pose", Cornell University Library: 201 Olin Library Cornell University, Nov. 23, 2016.

The European Search Report for European Application No. 18853733.6, dated Aug. 31, 2021, EPO, Munich, Germany.

Wu et al., "Single Image 3D Interpreter Network", Cornell University Library, 201 Olin Library Cornell University, Apr. 29, 2016.

\* cited by examiner

TECHNIQUES FOR RENDERING THREE-DIMENSIONAL ANIMATED GRAPHICS FROM VIDEO

CROSS-REFERENCE TO RELATED APPLICATIONS

This application is a continuation of International Application No. PCT/US2018/049503 filed Sep. 5, 2018 which claims the benefit of U.S. Provisional Patent Application No. 62/556,758 filed on Sep. 11, 2017, the contents of which are hereby incorporated by reference.

TECHNICAL FIELD

The present disclosure generally relates to animation systems, and more particularly to rendering animated, including photorealistic three-dimensional graphics from video streams.

BACKGROUND

Motion capture is the process of recording the movement of objects or people. It is used in military, entertainment, sports and medical applications. In filmmaking and video game development, it refers to recording actions of human actors and using the recorded actions to animate digital character models in two-dimensional (2D) or three-dimensional (3D).

Existing motion capture systems are based on creating control animation data that is mapped to a rigged 3D model. The motion capture data is typically generated by placing many sensors or markers on an object (e.g., an actor) and tracking the spatial locations of the sensors or markers to record 3D motions. This animation data is mapped to a 3D digital model. The 3D model therefore imitates the actions of the actor.

Other existing motion capture solutions designed to create photorealistic animations of 3D digital models of objects do not require any markers or sensors on the objects and typically use stereo cameras. In such solutions, the 3D model is created by detecting and tracking features in image sequences and correlating the features between the pair of cameras. Further, to prepare free viewpoint video of a complex scene, a large number of cameras (e.g., about 40 cameras) installed in different locations around an arena is required.

Further, motion capture solutions are limited in production of live events due to the extensive processing power and load required to extract the dynamic 3D model from such a large number of cameras. Thus, existing solutions are slow and very expensive, with complicated and expensive logistics.

It would therefore be advantageous to provide a solution that would overcome the deficiencies noted above.

BRIEF DESCRIPTION OF THE DRAWINGS

The foregoing and other objects, features, and advantages of the disclosed embodiments will be apparent from the following detailed description taken in conjunction with the accompanying drawings.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for creating three-dimensional (3D) graphics representations from video. The method comprises: generating a skeletal model for each of at least one non-rigid object shown in a video feed, wherein the video feed illustrates a sports event in which at least one of the at least one non-rigid object is moving; determining at least one 3D rigged model for the at least one skeletal model; and rendering the at least one skeletal model as a 3D representation of the sports event, wherein rendering the 3D skeletal model further comprises wrapping each of at least one 3D skeletal model with one of the at least one 3D rigged model, each 3D skeletal model corresponding to one of the generated at least one skeletal model, wherein each 3D rigged model is moved according to the movement of the respective skeletal model when the 3D skeletal model is wrapped with the 3D rigged model.

Certain embodiments disclosed herein also include a non-transitory computer readable medium having stored thereon causing a processing circuitry to execute a process, the process comprising: generating a skeletal model for each of at least one non-rigid object shown in a video feed, wherein the video feed illustrates a sports event in which at least one of the at least one non-rigid object is moving; determining at least one 3D rigged model for the at least one skeletal model; and rendering the at least one skeletal model as a 3D representation of the sports event, wherein rendering the 3D skeletal model further comprises wrapping each of at least one 3D skeletal model with one of the at least one 3D rigged model, each 3D skeletal model corresponding to one of the generated at least one skeletal model, wherein each 3D rigged model is moved according to the movement of the respective skeletal model when the 3D skeletal model is wrapped with the 3D rigged model.

Certain embodiments disclosed herein also include a system for creating three-dimensional (3D) graphics representations from video. The system comprises: a processing circuitry; and a memory, the memory containing instructions that, when executed by the processing circuitry, configure the system to: generate a skeletal model for each of at least one non-rigid object shown in a video feed, wherein the video feed illustrates a sports event in which at least one of the at least one non-rigid object is moving; determine at least one 3D rigged model for the at least one skeletal model; and render the at least one skeletal model as a 3D representation of the sports event, wherein the system is further configured to wrap each of at least one 3D skeletal model with one of the at least one 3D rigged model, each 3D skeletal model corresponding to one of the generated at least one skeletal model, wherein each 3D rigged model is moved according to the movement of the respective skeletal model when the 3D skeletal model is wrapped with the 3D rigged model.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments provide a method and system for capturing movements of non-rigid objects and animating 3D digital objects accordingly. In an embodiment, the animated 3D digital objects are 3D photorealistic graphical models rendered on-the-fly based on currently or previously recorded events such as, but not limited to, a sports event. To this end, the graphics may be rendered, for example, in real-time as movements during an event are being captured, when a previously recorded event is received, when a portion of an event ends (e.g., at the conclusion of a play in a sports game), and the like.

In an embodiment, the disclosed system is configured to render the 3D graphics from any video stream regardless of the type of camera utilized to capture the video or the viewpoint that the video was captured from. The rendered 3D environment including the animated digital objects allows for viewing of the scene and objects in the scene from any viewpoint.

In an embodiment, the disclosed system can be utilized in various applications. In an example implementation, the system can be utilized for replays in sports broadcasting events. In such an implementation, a replay can be broadcasted as a 3D animated content of a live event from any viewpoint. In yet another embodiment, the disclosed system, when integrated in a virtual reality headset, may provide a decision or training tool. This allows, for example, a trainee or a referee to immerse into the actual game that was played. In yet another embodiment, the disclosed system can be utilized to convert filmed events (e.g., a real-life American football game) into a virtual simulation (e.g., an American football video game). In the rendered virtual simulation, the viewpoint can be changed, thereby allowing users to watch the real game live dynamically from the viewpoint of any player or to play a virtual game starting from a time point in the real game.

Thus, in some implementations, the graphics may be utilized for instant replay applications. The instant replays may be rendered in real-time immediately after the respective portions of the event, and may be rendered not slower than, for example, video footage that is manually selected for replay. Further, instant replays may be provided at different viewpoints, for example at multiple different viewpoints simultaneously, at viewpoints not captured by any video cameras (e.g. reflected based or emissive based) at the location of the event, at viewpoints selected by users, and the like.

The embodiments described herein further allow for simulating alternative scenarios within events. The simulation of the alternative scenarios may include, but are not limited to, adding or replacing players (each may be assigned with predefined/configurable performance parameters) in a sports game (for example, replacing players with alternate player choices, adding retired or otherwise unavailable players, replacing in-game handicapped players with non-handicapped versions of those players, etc.), making different in-game decisions (e.g., passing a ball to a different player or utilizing different plays), making different referee judgment calls, changing environmental conditions (e.g., weather, amount of sunlight, etc.), and the like. Accordingly, some embodiments may be utilized for developing and evaluating tactics. The alternative scenarios may be displayed with a layer of instructional graphics guiding the user (e.g., player) as to what should be the next move (e.g., pass a ball in a certain direction).

The disclosed embodiments may be utilized for both professional and amateur applications. For example, the disclosed embodiments may be utilized to render 3D photorealistic models of professional soccer players, or of amateur players in a casual league.

In other implementations, the simulations may be utilized for fantasy sports. For example, the simulations may be utilized to evaluate impact of in-game decisions, injuries, player choices, and the like, on fantasy football scores. As a non-limiting example, a fantasy football manager may view a simulation showing the result of having a different quarterback starting an American football game on the fantasy points scored by a running back on the team to evaluate the effects of the other quarterback on the running back's fantasy points.

It should be noted that applications provided by the disclosed embodiments are not limited to sports events, but also can be applicable to other types of contents, such as entertainment events (e.g., concerts or other performances), medical events (e.g. surgeries or other treatment sessions), transportation (e.g. vehicle driving in urban scenarios with pedestrians), and so on.

Figure 1A:
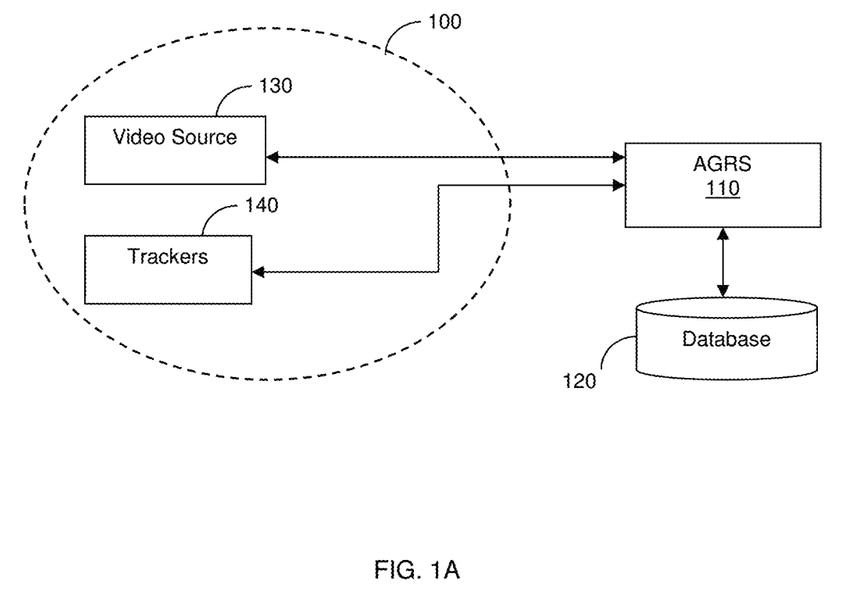
FIG. 1A is a diagram utilized to describe the various disclosed embodiments.

FIG. 1A shows an example diagram utilized to describe the various disclosed embodiments. An animated graphics rendering system (AGRS, hereinafter the "system") 110 is configured to render 3D animated graphics including, but not limited to, photorealistic graphics from video captured for a sports event. A sports event may be a live match, a training drill, a recorded match, and the like. The sports event may be of any sports activity such as, but not limited to, soccer, American football, basketball, swimming, baseball, and so on.

As illustrated in FIG. 1A, the system 110 is in communication with a database 120, a video source 130, and one or more trackers 140. The communication may be via a wired connection, a wireless connection, or both. The video source 130 and trackers 140 are placed in a monitored area 100. The monitored area 110 may include, for example, a playing field, a stadium, an arena, and so on.

The operation of the disclosed embodiments is performed in part by the system 110 based on video streamed, broadcasted, or otherwise recorded (hereinafter a "video feed") provided by a video source 130. The video source 130 may be an array of a small number of fixed cameras, a single fixed camera, one or more moving cameras, or one or more broadcast cameras utilized to broadcast a live event, any number of devices configured to capture video signals (e.g., smartphones), a combination thereof, and the like. Different non-limiting arrangements of the video source 130 are discussed herein below with reference to FIGS. 1B and 1C.

In an embodiment, the moving objects in the video feed are tracked based on positioning data provided by the trackers. The trackers may include any of, or a combination of, video trackers (either controlled by an operator or fully autonomous) using the video itself to track objects (players and ball), location sensors (e.g., GPS, RF based), or inertial sensors used in conjunction with the captured video to track and identify objects. It should be noted that tracking objects (athletes or players) throughout the event allows for their continuous identification. Other means for identification of such objects include, recognition of their jerseys' numbers, gait analysis of players, skin and hair colors, jersey colors, and the like. In another implementation, objects may be tracked in groups rather than individually. For example, players of the same team may be tracked with respect to the same color jersey. Various arrangements of the trackers are discussed with reference to FIGS. 1B and 1C.

In order to render the 3D animated graphics, the system 110 is configured to process the video feed received from the video source 130 and preferably positioning data received from the trackers 140. It should be noted that photorealistic 3D graphics is only one type of graphics that can be rendered, and the techniques disclosed herein are applicable for rendering any type of animated graphics.

The system 110 is configured to receive a video feed from the video source 130. To this end, the system 110 may be configured to extract skeletal models (skeletons) of each object (and particularly persons) appearing in the video feed. A skeletal model includes a rough approximation of an object. For instance, a skeletal model of a human can include an outline of the human's biological skeleton. A skeleton, in computing animation, is a set of bones that can be organized hierarchically where the movements are defined by the joint connections between sets of two bones.

The skeletal model for each object may be generated, for example, per video, per video frame, and the like. In an embodiment, the skeletal models can be extracted based on a deep-learning neural network or other machine learning techniques. In an embodiment, the system 110 is configured to classify the actions that are described with a set of a few basic postures. To this end, the system 110 includes a classifier (not shown) that is pre-trained with several models related to many clustered postures of objects. Different training sets may be provided for different types of objects, for different sports games, and the like, to allow for more accurate training with respect to specific implementations. For example, different training sets may be created for basketball activity and soccer activity, respectively. The model may be, but is not limited to, a model for determining probabilistic positions, a model for identifying players' movements (for example, using gait analysis), and the like.

In an embodiment, to allow for efficient skeletal model extraction, each object in the video feed is first bounded by a bounding box using image recognition techniques to detect a unique set of features of the object. Different sets of features may be used for different types of objects. For example, to detect a person, the unique set of features may include, but are not limited to, movement, leg opening (the typical "V" shape), color segmentation, aspect ratio, and so on. The skeletal model extraction process is executed on each bounding box. It should be appreciated that usage of the bounding boxes allows for reduced use of computing resources for skeletal model generation and, in particular, faster extraction plus reduced usage of processing power. In an embodiment, the skeletal model extraction is performed per video frame and the extracted skeletal models are saved in the database 120. Another optimization of use of processing power may be achieved by frame-to-frame tracking of a person classified as a person.

In an embodiment, the skeletal model extraction includes extracting a 2D skeleton from the video. In such an embodiment, a 3D model is created based on the extracted 2D model. Alternatively, the 3D skeletal model may be extracted directly from the video. Extraction of the 3D skeletal model may be performed using a similar process to extraction of 2D models (i.e., the same process extracting bones oriented in 3-dimensional space rather than 2).

Figure 2:
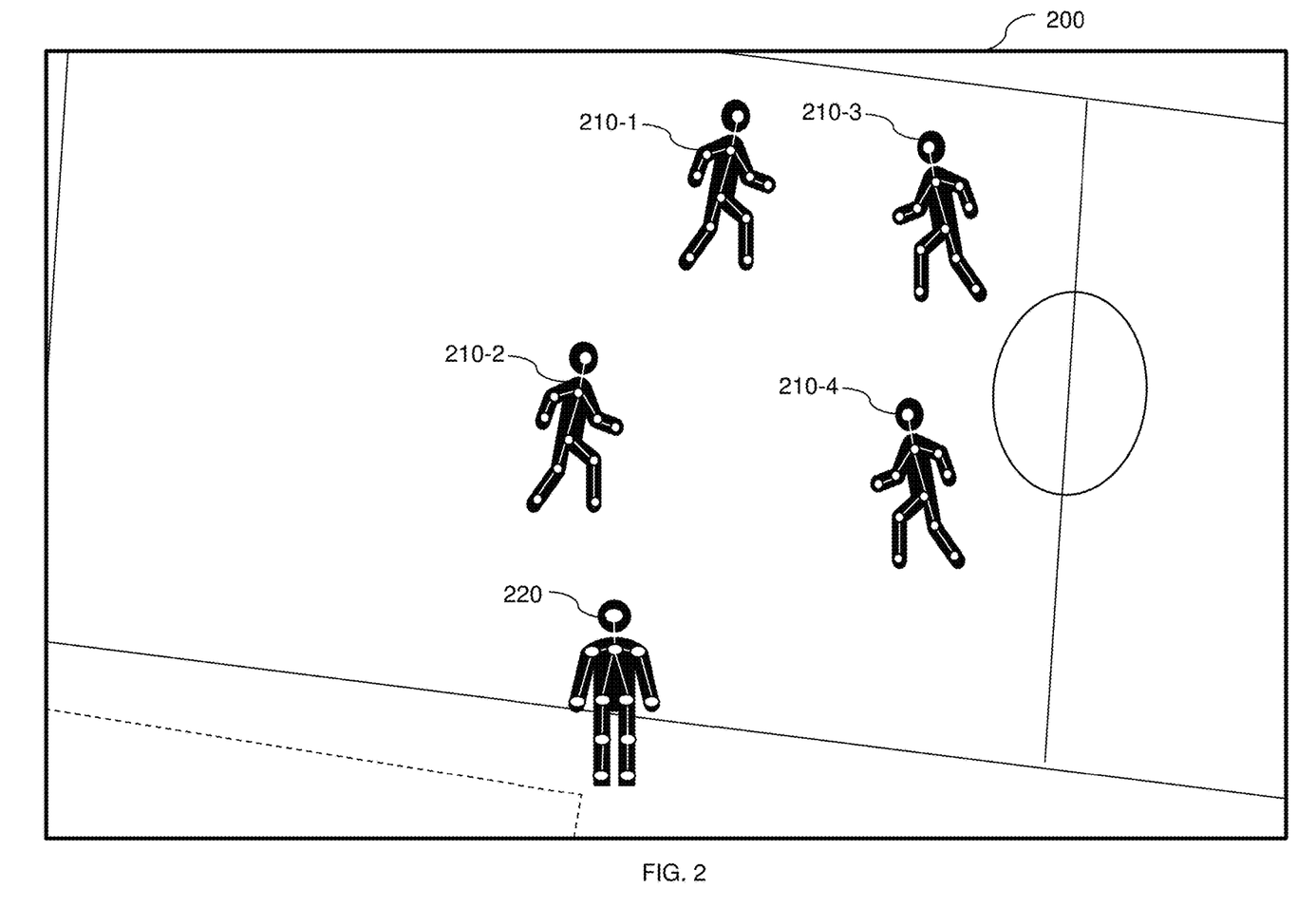
FIG. 2 shows a screenshot from a video frame illustrating 2D skeletons extracted for various objects.

FIG. 2 shows an example screenshot 200 from a video frame illustrating 2D skeletal models extracted for players 210-1 through 210-4 and a coach 220 shown in the video frame.

Returning to FIG. 1A, the system 110 is further configured to generate a 3D skeletal model (3D skeleton) for each object represented by a 2D skeletal model when 2D skeletal models are extracted from the video. Specifically, the conversion results in a single definitive 3D skeletal model for each 2D skeletal model. In an embodiment, many 3D skeletal models are generated from a single 2D skeletal model through a mathematical conversion process. However, a single definitive 3D skeletal model is selected therefrom based on a set of constraints, using a machine learning model, among a set of known 3D skeletal models, or a combination thereof. To this end, in an embodiment, the single definitive 3D skeletal model is selected based on constraints such as, but not limited to, poses of the objects, reference points (e.g., a goal line of a soccer field), and time continuity. In another embodiment, a machine learning model fed with the above constraints as features and trained with player movements based on the type of event may be utilized to generate the 3D skeletal models. In yet another embodiment, the 3D skeletal model may be selected as a best candidate from among known 3D skeletal models associated with known 2D skeletal models stored in a database.

In some embodiments, the system 110 may be further configured to continuously identity and track the 3D skeletal models in the video feed based on position data received from the trackers. In an embodiment, the tracking and identification is performed using video tracking and ID anchors such as the players' back numbers (using fixed or moving cameras) as discussed with reference to FIG. 1B. In another embodiment, the tracking and identification is performed using identification tags as discussed with reference to FIG. 1C. In another embodiment, the identification of objects (such as player) can be performed by an operator.

In yet another embodiment, the system 110 may be configured to track and identify an object using methods such as, but not limited to, machine vision, artificial intelligence, deep learning techniques, or a combination thereof, based on video captured by the video source 130. The features used by a machine vision system may include, but are not limited to, torso of a player, a jersey number of a player, common gestures, gait, hair color and style, a "heat map" (indicating probabilities of a player object being in a certain position of the monitored area), and the like.

In an embodiment, the system 110 is configured to track and determine the movement of non-human objects such as a ball by an analysis of the video feed. For example, if the ball is not seen or identified in a particular frame or sequence of frames, the ball movement path from one location to another location can be computed. Both locations may be identified prior to and after the period in which the ball is not seen or identified. For example, if a player throws a ball that is being caught by another player, and the locations of both players are known, the path of the ball between these locations can be estimated using a ballistic or other assumption. It should be noted that the tracking and identification is performed on each object shown in the video feed. For example, a soccer game may include the tracking of each player, each referee, and the ball.

Thereafter, the system 110 is configured to generate a 3D animated model of each object (e.g., a player). To this end, rigged models of the objects are animated using the spatial joints locations determined by the respective 3D skeletal models. In an embodiment, rigged models can be retrieved from the database 120. The animation may include placing the bones of the 3D skeletal model exactly where they would be in a "real world" skeleton (e.g., a human skeleton). Each defined bone is attached to its respective part of the object being animated. In this way, the bones control the final movements of the animated object.

In an embodiment, at least some of the 3D animated models may be generated based on interpolations in areas where it is determined that there is insufficient data to create an accurate animation. Insufficient data may be determined when, for example, it is determined that legs of the object have not been detected properly, e.g., when the skeletal model of the object does not demonstrate properly detected legs as compared to previous animations. In such a case, at least a portion of the 3D animated model (in this case, a portion related to leg movements) may be generated based on a predetermined 3D animated model.

In an embodiment, animated objects can be optimized to provide natural poses. This can be achieved, for example, by applying inverse kinematics constraints (e.g., on balance and bone lengths), using smoothing functions, selecting poses that appear to match known behaviors of players, or a combination thereof. In an optional configuration, an analysis is performed if the output animated model should be optimized.

Figure 3:
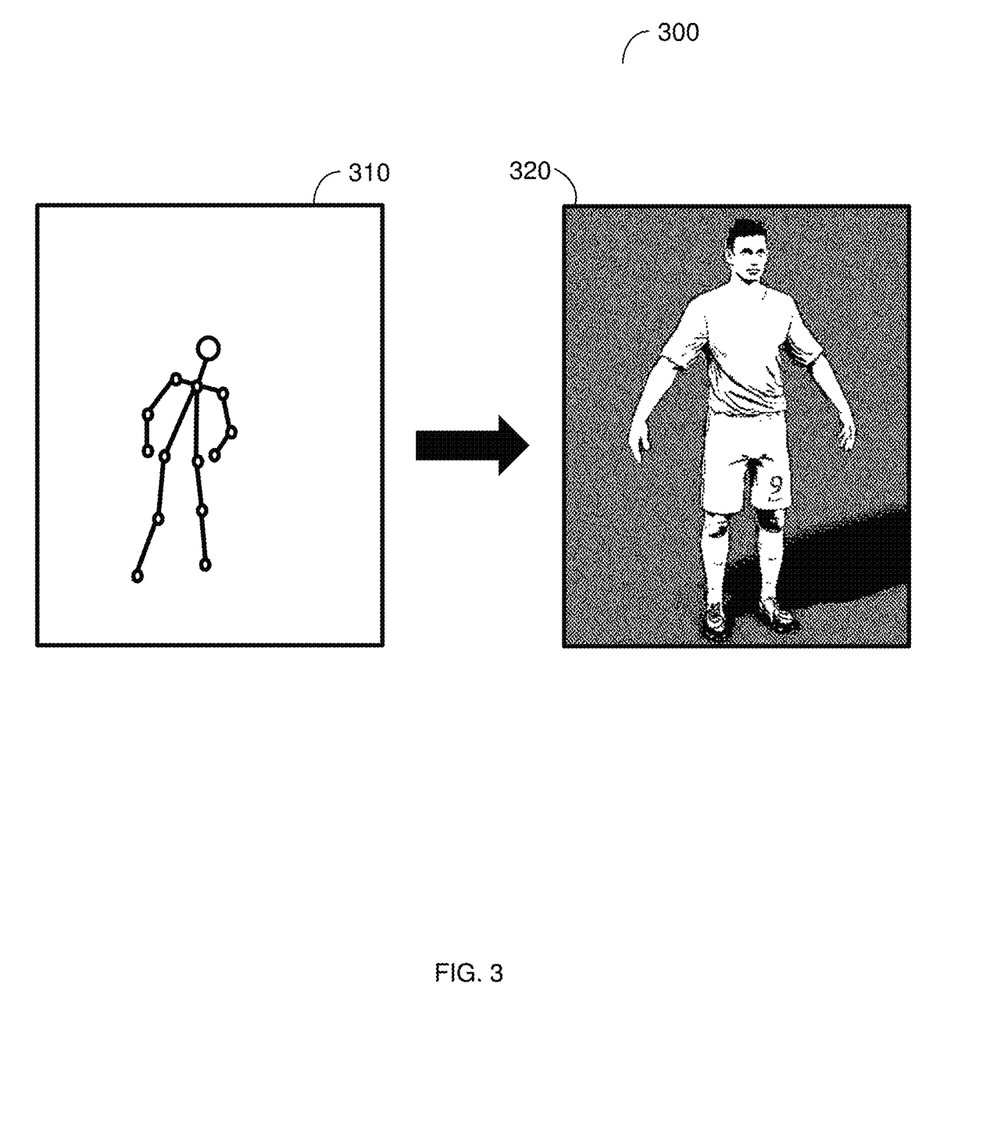
FIG. 3 shows screenshots illustrating a wrapping of a 3D skeleton with a 3D photorealistic model.

FIG. 3 shows an example screenshot demonstrating a wrapping of a 3D skeletal model 310 with a 3D photorealistic model 320 resulting in a real-time animated 3D representation of the received video of a sports player object.

Returning to FIG. 1A, the system 110 is further configured to generate a 3D graphical object of the environment. For example, the 3D graphical object may be a 3D graphical object of a stadium, arena, or a playing field. In an embodiment, the 3D graphical object is obtained from a database. The retrieval may be based on, for example, the actual stadium where video is captured at. In another embodiment, the graphical object of the environment may be rendered based on the video feed. This is performed by removing any moving objects from the video feed. In an example embodiment, this can be achieved using a pixel majority algorithm.

The output of the system 110 is an animated 3D representation of the live event. As an example, if the video feed is of a soccer match, the processing would result in an animated 3D representation of the match. This would allow for rendering the 3D world from any viewpoint including the point of view of each player, referee, coach, ball, and the like, recorded in the video.

In an embodiment, the creation of the animated 3D representation of a sports live event may include mapping of the real textures on 3D graphical models of the surroundings and rendering the entire 3D space including the players, ball, playing field, spectators stands, billboards, and other background features of stadiums, arenas, or playing fields. In yet another embodiment, the playing field and the surroundings can be represented as 3D graphical objects with synthetic textures that are either created or chosen from a library of predetermined 3D graphical objects.

The 3D animated models may be saved in the database 120. The animated 3D models may be rendered by a gaming console (e.g., Sony PlayStation 4®, Xbox One®, etc., not shown) or other device (not shown) configured for video games in which the animated 3D models may be used (e.g., a personal computer, a laptop computer, a tablet computer, a smartphone and the like). To this end, such consoles may have access to the database 120 to allow for downloading animated 3D models for use in rendering. In such an embodiment, the 3D skeletal model data and positioning data are sent to the consoles (e.g., over a network, not shown). It should be noted that rendered 3D animated content, or portions thereof, can be broadcast in such a format. As such, no digital broadcast rights are required.

It should be noted that, in one configuration, the system 110 may be a virtual server deployed in a cloud-computing platform. In another configuration, the system 110 may be a stand-alone server or computer installed in a broadcast control system or a studio. A stand-alone computer 110 may include a dedicated computer, a standard PC, a smartphone, a tablet computer, and the like. In yet another embodiment, the system 110 may be a gaming console. In such an embodiment, 3D skeletal models and positioning data are received by the system 110, and the rendering of the photorealistic 3D model is performed by the system 110.

Figure 1B:
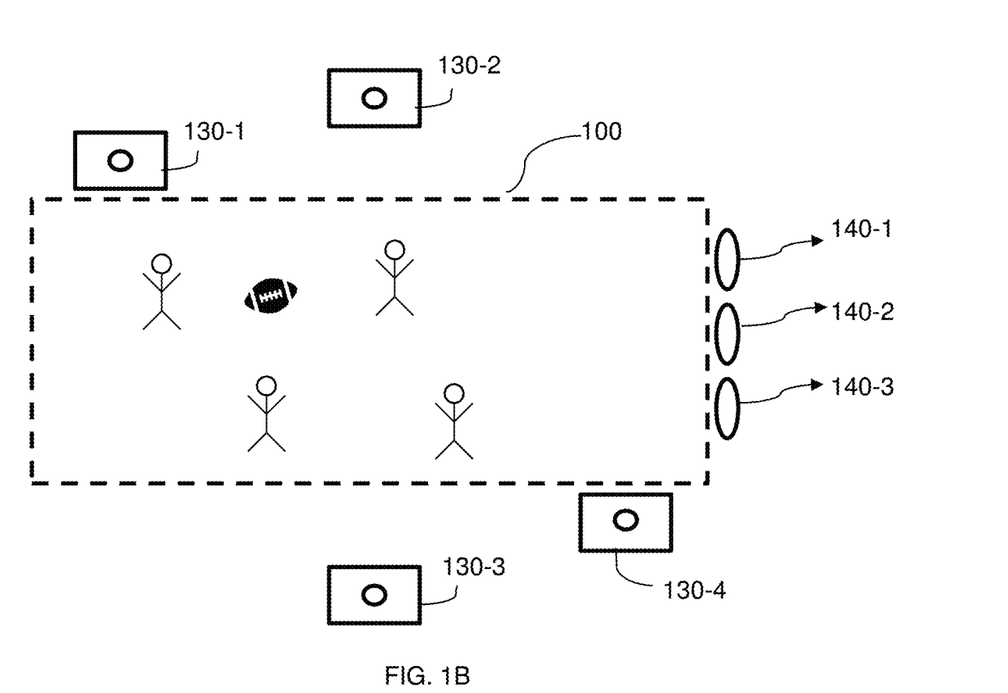
FIGS. 1B and 1C are diagrams illustrating various arrangements of a video source and trackers.

FIG. 1B shows the arrangement of the video source 130 and trackers 140 according to an embodiment. In this arrangement, the video source 130 includes a number of broadcast cameras 130-1 through 130-4. The broadcast cameras 130-1 through 130-4 are typically moving cameras utilized to capture the live event and deployed in the monitored area 100. The area 100 may be an indoor or outdoor playing field, a stadium, an arena, and the like. It should be noted that different cameras may be configured with different settings including, but not limited to, resolution, field-of-view, spectral response, sensitivity, dynamic range, background subtraction, gated or not, frame rate, video output format, TOF or not, and so on.

In the arrangement shown in FIG. 1B, the trackers 140 include video trackers realized by an array of fixed cameras 140-1 through 140-3 and tracking algorithms. The array of fixed cameras 140-1 through 140-3 are deployed in a single geographical location (e.g., within a geographical area). The cameras 140-1 through 140-3 capture every point in the monitored area 100. The captured video is processed to determine the positioning data of the field objects. Typically, the processing includes objects segmentation, blob analysis, and 3D objects localization and tracking. The processing can be performed by a processing circuitry (not shown) connected to the cameras 140-1 through 140-3 or by the system 110.

Figure 1C:
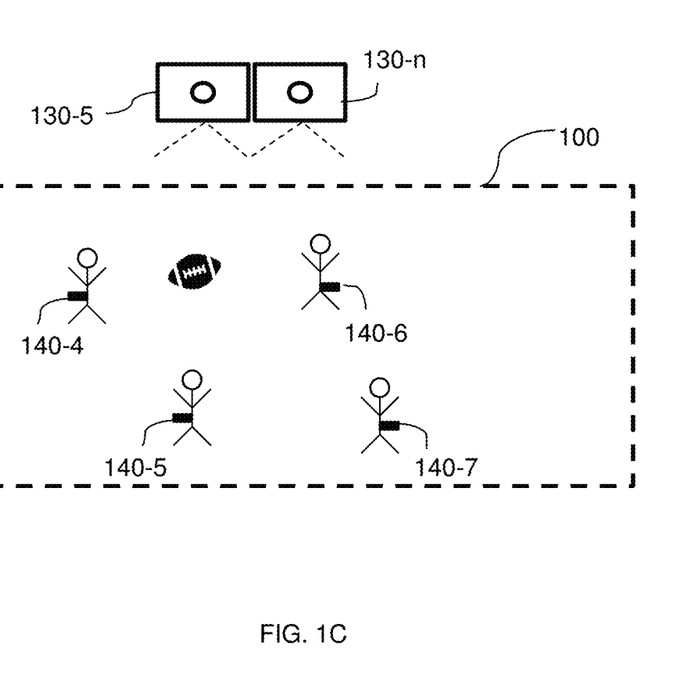

FIG. 1C shows the arrangement the video source 130 and the trackers 140 according to another embodiment. In this arrangement, the video source 130 includes an array of one or more fixed cameras 130-5 through 130-*n* (hereinafter referred to as cameras 130 for simplicity). The number of cameras 130 is relatively small (e.g., 3 cameras).

The cameras 130 are deployed in or near (e.g., within a threshold distance of) a monitored area (e.g., a soccer field) in which moving objects are to be tracked, and are configured to capture videos of the monitored area. Specifically, the cameras 130 may be configured to capture videos featuring moving objects (such as, players, referees, balls, etc.) in the monitored area 100. In an embodiment, a single panoramic camera 130 (not shown) may be utilized.

In the arrangement shown in FIG. 1C, the trackers 140 include a plurality of tags (collectively shown as tags 140-4 through 140-7 and referred to as tags 140 or as a tag 140 for simplicity). Each of the tags 140 may be mounted or otherwise disposed on or inside of an object in the monitored area. In an example implementation, each tag 140 may be disposed on an article of clothing of the respective object, a lower back of the respective object, or integrated in a wearable device.

Each tag 140 may include one or more inertial sensors including, for example, an accelerometer, a gyroscope, a magnetometer, a pedometer, a combination thereof, and the like. The tags 140 may be realized using MEMS technologies. In some optional configurations, a tag 140 may include a location sensor, such as a GPS.

In an embodiment, each tag 140 includes a memory (not shown) for storing sensory data collected by the one or more inertial sensors included in the tag 140. In some implementations, each tag 140 may further include a short-range wireless communication transceiver, such as, but not limited to, BLT, Near Field Communication (NFC), ZigBee, and the like. In an optional embodiment, each tag 140 may be configured for long-range wireless communication, such as, but not limited to, Wi-Fi. In such an embodiment, the sensory data gathered by the sensors may be transmitted in real-time to system 110.

In an embodiment, the tracking is performed using the sensory data collected by the tags 140. To this end, the system 110 is configured to track and record the position of each object based on an analysis of the captured sensory data and the video feed. In areas or at times where a unique visual of an object is not available, the position of the object may be determined based on acceleration sensory data collected by the accelerometers, gyros, and magnetometers of the tag 140 disposed on the object. In an embodiment, the position may be determined based on player steps recognition and counting or double integrating acceleration over acceleration data corresponding to each player object to determine changes in position of the player object. It should be noted that, in some implementations, the reliance on such data for extended periods of time may be limited.

In yet another embodiment, the identities of the objects are automatically determined by matching profiles generated based on inertial sensor readings of the tags 140 to profiles based on optical data captured by the cameras 130. In a further embodiment, the inertial sensor profiles may include or be based on, but are not limited to: linear acceleration, angular acceleration, speed magnitude, speed direction, position vector, position value at a given time, magnetic north direction and a combination thereof. The identity of each object may be indicated in a memory of a respective tag 140 deployed in or on the object. Thus, in some implementations, the inertial sensor data from the tags 140 may be utilized to determine object positions even when optical data does not allow for such determination.

In yet another embodiment, dead reckoning techniques can be used to determine the objects' positions when they are either occluded from view of the cameras 130 or when they are in a collision event and cannot be separated optically. According to such techniques, a subsequent position may be determined based on a number of steps or a distance and direction of movement of the object (e.g., as indicated by signals captured by sensors of the tags 140) of the object and its previous position. For example, a subsequent position may be determined based on a previous position and global positioning system (GPS) data captured by GPS sensors of the tags 140. In a further embodiment, determining the subsequent position may include determining a length and direction of each step. The length and direction of each step can be determined using analysis of the profiles generated based on the inertial sensors of the tags 140.

In yet another embodiment, the objects' positions throughout the event are determined using inertial sensor devices included in the tags 140 without any visual input by using the dead reckoning technique described herein above in combination with step lengths and directions determined based on an analysis of the temporal acceleration data and double integration during the step duration or other methods to estimate the step length and direction.

It should be noted that the video source 130 and trackers 140 can be deployed in different arrangements than those illustrated in FIGS. 1B and 1C, without departing from the scope of the disclosed embodiments.

Figure 4:
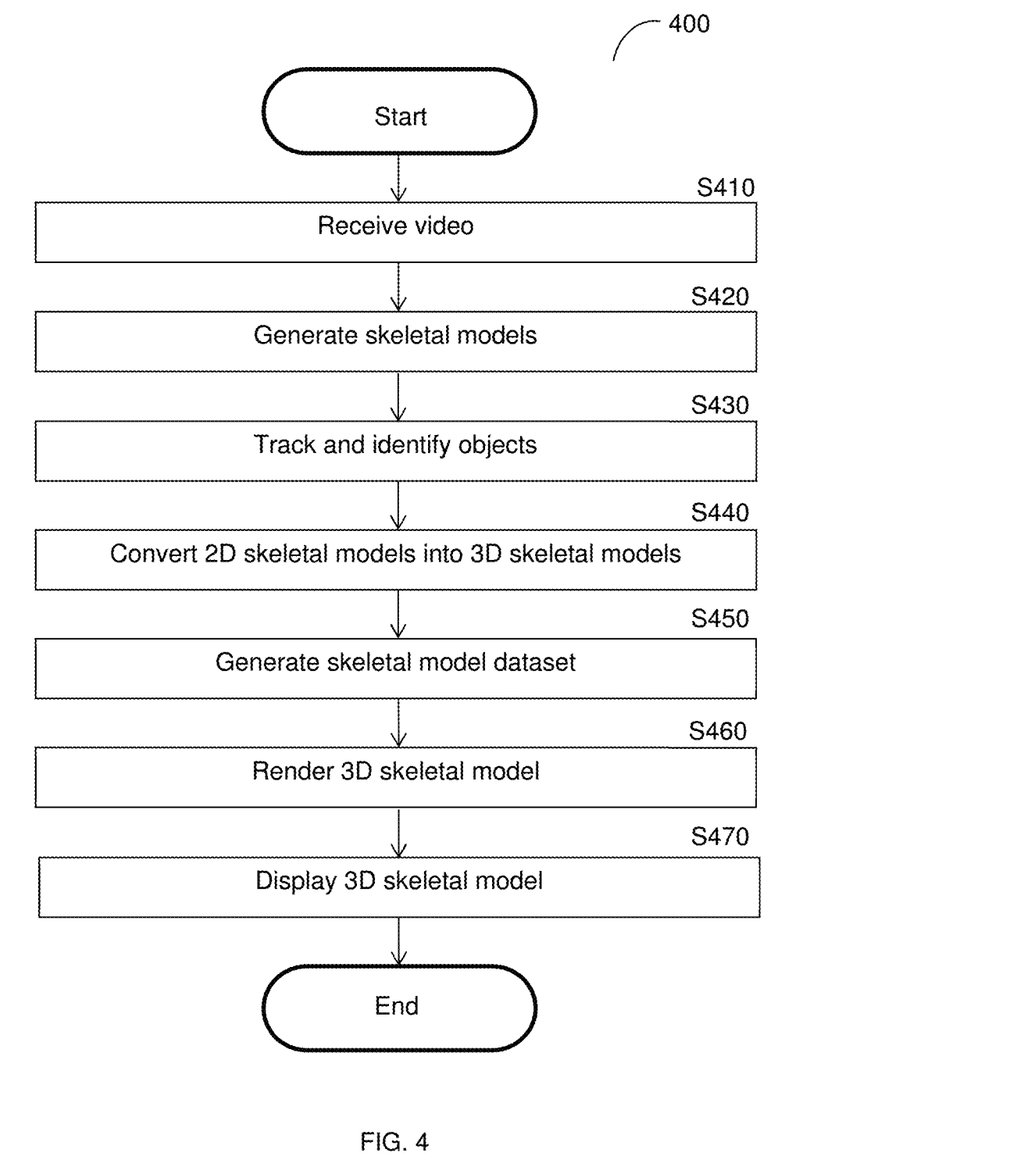
FIG. 4 is a flowchart illustrating a method for rendering 3D animated graphics based on videos according to an embodiment.

FIG. 4 is an example flowchart 400 illustrating a method for rendering 3D graphics according to an embodiment. As noted above, such graphics are generated on-the-fly based on received video. The received video may be broadcasted, streamed, or otherwise recorded.

The video may be recorded by one or more cameras deployed in an area where, for example, sport activity is being recorded. The cameras can be an array of broadcast cameras, a single panoramic camera, or any number of devices configured to capture video signals (e.g., smartphones). The camera(s) may or may not be calibrated.

At S410, video feed captured by the one or more cameras is received. The video feed may include separate feeds coming from each camera composing the array of cameras used to create the panoramic view.

At S420, for each human object detected in a frame of the received video feed, a skeletal model is generated. As noted above, the skeletal model may be generated in real-time or off-line using a machine learning model trained to identify skeletons based on known postures of objects. Generating the skeletal models may further include creating boundary boxes around objects shown in the video and extracting features of the object in each bounding box. In an example implementation, each skeletal model is associated with a unique identifier (ID). In some implementations, skeletal models may also be created for non-human objects such as, but not limited to, horses.

At optional S430, each object in the received video is tracked and identified. In an example, an object may be a person (e.g., player, a referee, a coach, etc.) or a ball. The objects are continuously tracked throughout the duration of the video feed. This allows, in part, for determination of the location of each object and its movement. Further, the tracking allows for unique identification of each object (and, in a particular implementation, each player) or groups of objects (i.e., by identifying each object as belonging to a particular group). The identification of a player can be utilized to associate the player with a respective skeletal model, and the identification of a group of players can be utilized to associate the group with a respective group of skeletal models (e.g., a group of skeletal models of players wearing the same color jersey). In some embodiments, the identification of a player may be performed by a director at a broadcast control system.

Various embodiments for tracking objects are discussed in greater detail above. To this end, the objects may be identified, for example, using machine learning (e.g., with respect to attributes such as jersey numbers or colors, gait analysis, player features, and the like), by fusion of data from cameras and other sensors deployed with respect to the objects, based on user inputs related to initial identification of objects, and the like. The fusion of camera and sensor data may include matching optical data with sensory data to identify the objects as described further in U.S. patent application Ser. No. 15/997,189, assigned to the common assignee, the contents of which are hereby incorporated by reference.

At optional S440, when 2D skeletal models are generated at S420, each 2D skeletal model is converted into a definitive 3D skeletal model. In an embodiment, the conversion is performed based on one or more constraints, using a pre-trained machine learning model, by selecting a 3D skeletal model from among candidate models associated with 2D skeletal models in a database, or a combination thereof. The machine learning model is pre-trained per a specific type of event (e.g., a particular sport). In another embodiment, multiple 3D skeletal models are generated from a single 2D skeletal model, and a single definitive 3D skeletal model is selected therefrom based on a set of constraints. Such constraints may include, but are not limited to, poses of the players and kinematic rules, reference points (e.g., a goal line of a soccer field), and time continuity. Each 3D skeletal model is associated with the respective 2D skeletal model and with the identification of an object (e.g., a jersey number). In yet another embodiment, a 3D skeletal model may be selected from among candidate 3D skeletal models in a database based on candidate 2D skeletal models associated with the candidate 3D skeletal models and the generated 2D skeletal models.

At S450, a skeletal model dataset is generated. In an embodiment, such dataset includes at least 3D skeletal models, their respective IDs, and the objects' IDs that are associated with the 3D skeletal models. In an embodiment, the skeletal model dataset is saved in a database for a future use. In yet another embodiment, the skeletal model dataset is sent to a remote system such as, for example, a gaming console.

At S460, each 3D skeletal model is wrapped with a 3D rigged model of the respective object, thereby rendering the models (which may be, but are not limited to, photorealistic models) as 3D animated graphics. The rigged models, when wrapped on the 3D skeletal models, are moved according to the movement of the respective 3D skeletal models.

The respective 3D rigged model may be selected for a 3D skeletal model using the object identification. The matching of a 3D skeletal model to the 3D rigged model is based on an association between the skeletal model ID and the object identification. For example, a 3D skeletal model ID "2769" is associated with object identification of a player name "Joe Smith". The rigged model matching "Joe Smith" is selected to wrap the 3D skeletal model ID "2769". In some implementations, generic models may be chosen for all objects. In other implementations, multiple categories of generic models may be used.

In some implementations, the animated models may be integrated into a graphical 3D environment such as, for example, a graphical sports stadium model. In other implementations, the animated models may be integrated into environments including real video textures such as the playing field extracted from the match video.

At S470, the 3D animated graphics are displayed. In some embodiments, the graphics are saved in a database (e.g., the database 160) for future use. The rendered animated graphics can be displayed on standard TV, a mobile device (e.g., a smartphone), a virtual reality headset, and the like.

It should be noted that the order of the steps of the method should not be limited to the order described herein. Specifically, some steps may be performed in parallel or performed in a different order than the order shown in FIG. 4.

The rendered animated (photorealistic) graphics may be displayed in real-time in parallel with the original video feed, shortly after the original video feed, or at a later time. The display may be, for example, on one or more televisions, head-mounted displays, screens in a stadium, and the like. In some embodiments, the 3D animated graphics are displayed instead of the video feed, thereby allowing for reduced throughput related to displaying in-event activity (for example, bandwidth utilized to stream a sports event).

According to the disclosed embodiments, the method for rendering 3D animated graphics can be utilized for a variety of different applications. In a first example, an application for real-time 3D animated representation of a live match is rendered. The animated graphics can be displayed from any viewpoint including viewpoints of every object in a frame. For example, the rendering techniques can allow users to watch a game from the viewpoint of a player (i.e., as if the user is the player). It should be noted that rendered 3D animated graphics, or portions thereof, can be broadcast in such format. As such, no video broadcast rights are required.

In yet another embodiment, a coaching implementation is disclosed. In such an implementation, a trainee is immersed into real play in a game. The play may be of any monitored object. That is, for example, the coaching implementation can be utilized to teach players, referees, and event team coaches. In this implementation, different scenarios can be added to rendered content to simulate events occurring during the game. For example, if the content rendered based on a game where a quarterback passed the ball to a right receiver, a scenario demonstrating what would have happened if the ball was passed to the left receiver may be simulated. As another example, the rendered content may allow for referee judgment calls, commentator inputs, or both, thereby allowing for simulations of games demonstrating the accuracy of such judgment calls or inputs. Further, referee judgment calls or commentator inputs may be generated automatically based on, for example, machine learning of previous judgment calls and inputs, thereby allowing for automated referees and commentators.

In an embodiment, the 3D animated models may be utilized for converting a live event into a simulation, for example using a gaming console. In this embodiment, the skeletal model spatial joints locations are sent to a gaming console (located at the viewer's home) on each video frame and the 3D graphical models are positioned in these locations and are acquiring their specified 3D poses before being rendered from a chosen viewpoint. This allows a user to view an animated version of a real live match. Further, the animated content can be viewed from any viewpoint including specified players' heads. In another embodiment, the user can interact with the animated content. For example, the user can play "instead" of a real player in the match. That is, the user can stop the live match, play back, and change the player's actions. The configuration may be through an API.

Figure 5:
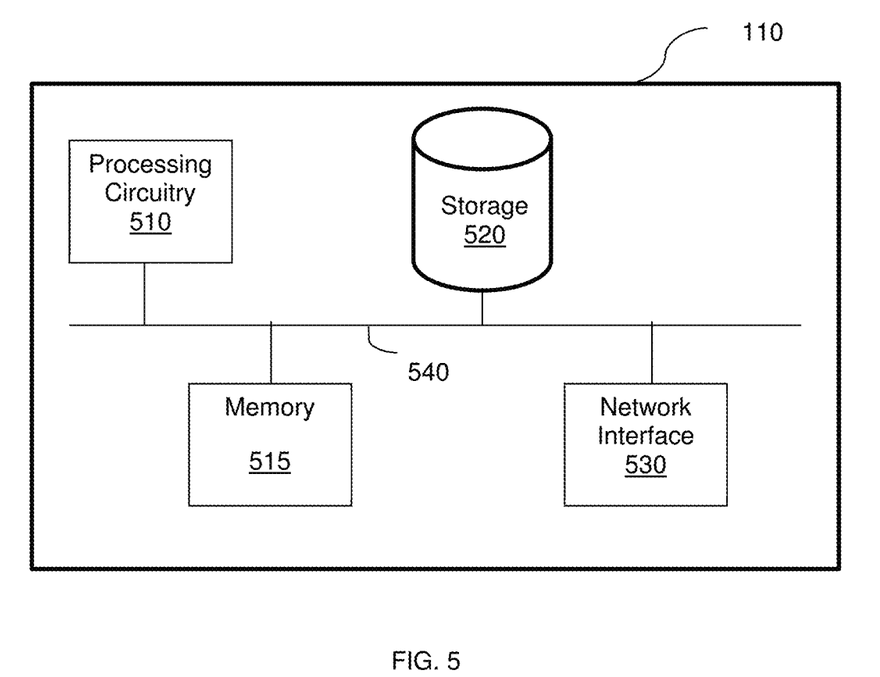
FIG. 5 is a block diagram of a system for rendering 3D animated graphics according to an embodiment.

FIG. 5 is an example block diagram of the system 110 according to an embodiment. The system 110 includes a processing circuitry 510 coupled to a memory 515, a storage 520, and a network interface 530. The components of the system 110 may be communicatively connected via a bus 540.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), graphics processing units (GPUs), and the like, or any other hardware logic components that can perform calculations or other manipulations of information.

The memory 515 may be volatile (e.g., RAM, etc.), non-volatile (e.g., ROM, flash memory, etc.), or a combination thereof. In one configuration, computer readable instructions to implement one or more embodiments disclosed herein may be stored in the storage 520.

In another embodiment, the memory 515 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 510 to perform the various processes described herein. Specifically, the instructions, when executed, cause the processing circuitry 510 to perform the embodiments described herein.

The storage 520 may be magnetic storage, optical storage, and the like, and may be realized, for example, as flash memory or other memory technology, CD-ROM, Digital Versatile Disks (DVDs), or any other medium which can be used to store the desired information.

The network interface 530 allows the system 110 to communicate with game consoles, trackers, or media streams servers (for received video) over a communication network.

It should be understood that the embodiments described herein are not limited to the specific architecture illustrated in FIG. 5, and other architectures may be equally used without departing from the scope of the disclosed embodiments.

It should be noted that various embodiments described herein are discussed with respect to sports events merely for simplicity purposes and without limitations on the disclosure. The disclosed embodiments may be equally applicable to other types of events such as, for example, concerts, plays, surgeries, and the like, and 3D animated graphics created according to the disclosed embodiments may be provided thereto. It should also be noted that various embodiments are described with respect to skeletal models merely for simplicity purposes and without limitation on the disclosure. Skeletal models may be created and utilized for objects lacking a skeleton (e.g., balls or other inanimate objects, animals lacking a skeleton, and the like).

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for creating three-dimensional (3D) graphics representations from video, comprising:
    generating at least one skeletal model, each of the at least one skeletal model being for a respective one of at least one object shown in a video feed, each of the at least one object being non-rigid, wherein the video feed illustrates a sports event in which at least one of the at least one object is moving, at least one of the at least one object being a player in the sports event, each player wearing a jersey having a number, wherein at least one respective player is detectable by its respective jersey number;
    detecting at least one jersey number that corresponds to at least one respective one of the at least one object that is a player in the video feed and to the skeletal model therefor;
    obtaining at least one 3D rigged model, each of the at least one 3D rigged model corresponding to a respective player based on the detected at least one jersey number; and
    rendering the at least one skeletal model as a 3D skeletal model that is a representation of a portion of the sports event, wherein rendering the at least one skeletal model as a 3D skeletal model further comprises wrapping each of at least one 3D skeletal model with the respective one of the at least one 3D rigged model that corresponds to the at least one player having the respective detected jersey number so that each rendered 3D skeletal model corresponds to one of the generated at least one skeletal model, wherein each 3D rigged model is moved according to the movement of its respective skeletal model when the 3D skeletal model is wrapped with the 3D rigged model.

2. The method of claim 1, wherein the video feed shows the at least one object in a monitored area, wherein at least one tracker is deployed in the monitored area, each of the at least one tracker including at least one sensor for capturing data related to movement of at least one of the at least one object.

3. The method of claim 2, wherein the at least one tracker includes at least one tag, wherein each tag of the at least one tag is disposed on at least one of the at least one object that is being tracked, each tag of the at least one tag including at least one of at least one inertial sensor and a location sensor.

4. The method of claim 2, further comprising:
tracking, based on data captured by the at least one tracker, a position with respect to the video feed of at least one object of the at least one object that is being tracked, wherein the at least one tracker includes at least one video camera and is deployed such that the at least one tracker captures video of the monitored area during the sports event, wherein the at least one 3D skeletal model is rendered based on the position of each object for the duration of the video feed.

5. The method of claim 2, further comprising:
identifying each of the at least one object shown in the video feed, at least one identified object having its identification based on the data captured by the at least one tracker; and
associating each of the at least one object with its respective skeletal model based on the identification.

6. The method of claim 1, wherein the video feed shows the at least one object in a monitored area, further comprising:
identifying each of the at least one object shown in the video feed;
wherein the 3D rigged model obtained for each 3D skeletal model is determined based on the identification of each of the at least one object shown in the video feed.

7. The method of claim 5, wherein each tracker is disposed on one of the at least one object shown in the video feed, wherein identifying each of the at least one object shown in the video feed further comprises:
matching the video feed to the data captured by the at least one tracker to identify each object shown in the video feed having a tracker with respect to the tracker disposed thereon.

8. The method of claim 6, wherein identifying at least one of the at least one object shown in the video feed further comprises:
applying a machine learning model to the video feed, wherein the machine learning model is trained using a training set including features, wherein the training set features include at least one of: jersey numbers, gait analysis results, and visual identifiers of players.

9. The method of claim 5, wherein each of the at least one object shown in the video feed is identified based further on at least one user input, wherein the at least one user input indicates an identifier of each of the at least one object.

10. The method of claim 4, further comprising:
determining, using image processing based on the video feed, whether each of the at least one object shown in the video feed is a person object, wherein the at least one of the at least one object that is being tracked includes at least one human object of the at least one object shown in the video feed.

11. The method of claim 1, wherein each generated skeletal model is a 2D skeletal model, wherein each 2D skeletal model is converted into a 3D skeletal model using a machine learning model, wherein the machine learning model is trained using a training set including training constraints, wherein the training constraints include at least one of: poses of objects, reference points, and time continuities.

12. The method of claim 11, wherein converting each 2D skeletal model into the 3D skeletal model further comprises:
generating a plurality of potential 3D skeletal models for the 2D skeletal model; and
selecting one potential 3D skeletal model of the plurality of potential 3D skeletal models as the 3D skeletal model for the 2D skeletal model.

13. The method of claim 1, wherein each of the at least one generated skeletal model is a 3D skeletal model.

14. The method of claim 1, wherein generating the at least one skeletal model further comprises:
classifying actions with respect to at least one set of basic postures.

15. The method of claim 14, wherein the actions are classified using a machine learning model, wherein the machine learning model is trained using a training set including clustered training postures of objects shown in previously captured video feeds.

16. The method of claim 1, wherein the 3D representation of the sports event is rendered on-the-fly as the video feed is received.

17. The method of claim 1, wherein the video feed includes a plurality of video frames, further comprising:
integrating the rendered 3D model into a graphical 3D environment showing the sports event;
determining a viewpoint for rendering the graphical 3D environment; and
creating a video clip of the sports event by rendering the graphical 3D environment with respect to the determined viewpoint based on each of the plurality of video frames.

18. The method of claim 1, wherein the sports event is a live event, wherein the 3D representation of the sports event is rendered on-the-fly during the live event, wherein the rendered 3D representation of the sports event is broadcast as at least a portion of a replay during the live event.

19. The method of claim 1, wherein the 3D representation of the sports event is rendered as part of a virtual reality display.

20. The method of claim 1, wherein the sports event is a real-life event, wherein the 3D representation of the sports event is rendered as part of a virtual simulation of the real-life event.

21. The method of claim 20, wherein the virtual simulation of the sports event is a virtual simulation of an alternative scenario of the sports event, wherein the alternative scenario differs from the sports event with respect to at least one of: at least one added player, at least one removed player, at least one replaced player, at least one in-game decision, at least one referee judgment call, and at least one environmental condition.

22. The method of claim 21, wherein the virtual simulation of the alternative scenario is utilized to evaluate at least one impact of the alternative scenario on at least one fantasy sports score.

23. The method of claim 1, wherein the video feed is captured by at least one of: an array of fixed cameras, a single fixed camera, at least one moving camera, at least one broadcast camera, and at least one device configured to capture video signals.

24. A non-transitory computer readable medium having stored thereon instructions for causing a processing circuitry to execute a process, the process comprising:
generating at least one skeletal model, each of the at least one skeletal model being for a respective one of at least one object shown in a video feed, each of the at least one object being non-rigid, wherein the video feed illustrates a sports event in which at least one of the at least one object is moving, at least one of the at least one object being a player in the sports event, each player wearing a jersey having a number, wherein at least one respective player is detectable by its respective jersey number;

detecting at least one jersey number that corresponds to at least one respective one of the at least one object that is a player in the video feed and to the skeletal model therefor;

obtaining at least one 3D rigged model, each of the at least one 3D rigged model corresponding to a respective player based on the detected at least one jersey number; and rendering the at least one skeletal model as a 3D skeletal model that is a representation of a portion of the sports event, wherein rendering the at least one skeletal model as a 3D skeletal model further comprises wrapping each of at least one 3D skeletal model with the respective one of the at least one 3D rigged model that corresponds to the at least one player having the respective detected jersey number so that each rendered 3D skeletal model corresponds to one of the generated at least one skeletal model, wherein each 3D rigged model is moved according to the movement of its respective skeletal model when the 3D skeletal model is wrapped with the 3D rigged model.

25. A system for rendering three-dimensional (3D) graphics from video, comprising:

a processing circuitry; and a memory, the memory containing instructions that, when executed by the processing circuitry, configure the system to:

generate at least one skeletal model, each of the at least one skeletal model being for a respective one of at least one object shown in a video feed, each of the at least one object being non-rigid, wherein the video feed illustrates a sports event in which at least one of the at least one object is moving, at least one of the at least one object being a player in the sports event, each player wearing a jersey having a number, wherein at least one respective player is detectable by its respective jersey number;

detect at least one jersey number that corresponds to at least one respective one of the at least one object that is a player in the video feed and to the skeletal model therefor;

obtain at least one 3D rigged model, each of the at least one 3D rigged model corresponding to a respective player based on the detected at least one jersey number; and render the at least one skeletal model as a 3D skeletal model that is a representation of a portion of the sports event, wherein to render the at least one skeletal model as a 3D skeletal model the system is further configured to:

wrap each of at least one 3D skeletal model with the respective one of the at least one 3D rigged model that corresponds to the at least one player having the respective detected jersey number so that each rendered 3D skeletal model corresponds to one of the generated at least one skeletal model, wherein each 3D rigged model is moved according to the movement of its respective skeletal model when the 3D skeletal model is wrapped with the 3D rigged model.

26. The system of claim 25, wherein the video feed shows the at least one object in a monitored area, wherein at least one tracker is deployed in the monitored area, each of the at least one tracker including at least one sensor for capturing data related to movement of at least one of the at least one object.

27. The system of claim 26, wherein the at least one tracker includes at least one tag, wherein each tag of the at least one tag is disposed on at least one of the at least one object that is being tracked, each tag of the at least one tag including at least one of at least one inertial sensor and a location sensor.

28. The system of claim 25, wherein the system is further configured to:

track, based on data captured by the at least one tracker, a position with respect to the video feed of at least one object of the at least one object that is being tracked, wherein the at least one tracker includes at least one video camera and is deployed such that the at least one tracker captures video of the monitored area during the sports event, wherein the at least one 3D skeletal model is rendered based on the position of each object for the duration of the video feed.

29. The system of claim 25, wherein the system is further configured to:

identify each of the at least one object shown in the video feed, at least one identified object having its identification based on the data captured by the at least one tracker; and associate each of the at least one object with its respective skeletal model based on the identification.

30. The system of claim 25, wherein the video feed shows the at least one object in a monitored area, and wherein the system is further configured to:

identify each of the at least one object shown in the video feed;

wherein the 3D rigged model obtained for each 3D skeletal model is determined based on the identification of each of the at least one object shown in the video feed.

31. The system of claim 29, wherein each tracker is disposed on one of the at least one object shown in the video feed, wherein identifying each of the at least one object shown in the video feed further comprises:

matching the video feed to the data captured by the at least one tracker to identify each object shown in the video feed having a tracker with respect to the tracker disposed thereon.

32. The system of claim 30, wherein to identify at least one of the at least one object shown in the video feed the system is further configured to:

apply a machine learning model to the video feed, wherein the machine learning model is trained using a training set including features, wherein the training set features include at least one of: jersey numbers, gait analysis results, and visual identifiers of players.

33. The system of claim 29, wherein each of the at least one object shown in the video feed is identified based further on at least one user input, wherein the at least one user input indicates an identifier of each of the at least one object.

34. The system of claim 28, wherein the system is further configured to:

determine, using image processing based on the video feed, whether each of the at least one object shown in the video feed is a person object, wherein the at least one of the at least one object that is being tracked includes at least one human object of the at least one object shown in the video feed.

35. The system of claim 25, wherein each generated skeletal model is a 2D skeletal model, wherein each 2D skeletal model is converted into a 3D skeletal model using a machine learning model, wherein the machine learning model is trained using a training set including training constraints, wherein the training constraints include at least one of: poses of objects, reference points, and time continuities.

36. The system of claim 35, wherein the system is further configured to:
   generate a plurality of potential 3D skeletal models for the 2D skeletal model; and
   select one potential 3D skeletal model of the plurality of potential 3D skeletal models as the 3D skeletal model for the 2D skeletal model.

37. The system of claim 25, wherein each of the at least one generated skeletal model is a 3D skeletal model.

38. The system of claim 25, wherein the system is further configured to:
   classify actions with respect to at least one set of basic postures.

39. The system of claim 38, wherein the actions are classified using a machine learning model, wherein the machine learning model is trained using a training set including clustered training postures of objects shown in previously captured video feeds.

40. The system of claim 25, wherein the 3D representation of the sports event is rendered on-the-fly as the video feed is received.

41. The system of claim 25, wherein the system is further configured to:
   integrate the rendered 3D model into a graphical 3D environment showing the sports event;
   determine a viewpoint for rendering the graphical 3D environment; and
   create a video clip of the sports event by rendering the graphical 3D environment with respect to the determined viewpoint based on each of the plurality of video frames.

42. The system of claim 25, wherein the sports event is a live event, wherein the 3D representation of the sports event is rendered on-the-fly during the live event, wherein the rendered 3D representation of the sports event is broadcast as at least a portion of a replay during the live event.

43. The system of claim 25, wherein the 3D representation of the sports event is rendered as part of a virtual reality display.

44. The system of claim 25, wherein the sports event is a real-life event, wherein the 3D representation of the sports event is rendered as part of a virtual simulation of the real-life event.

45. The system of claim 44, wherein the virtual simulation of the sports event is a virtual simulation of an alternative scenario of the sports event, wherein the alternative scenario differs from the sports event with respect to at least one of: at least one added player, at least one removed player, at least one replaced player, at least one in-game decision, at least one referee judgment call, and at least one environmental condition.

46. The system of claim 45, wherein the virtual simulation of the alternative scenario is utilized to evaluate at least one impact of the alternative scenario on at least one fantasy sports score.

47. The system of claim 25, wherein the video feed is captured by at least one of: an array of fixed cameras, a single fixed camera, at least one moving camera, at least one broadcast camera, and at least one device configured to capture video signals.

* * * * *